United States Patent
Rouzade

(10) Patent No.: US 12,006,020 B2
(45) Date of Patent: Jun. 11, 2024

(54) AIRCRAFT DOOR PROVIDED WITH A LEVER FOR EMERGENCY OPENING FROM OUTSIDE

(71) Applicant: LATECOERE, Toulouse Occitaine (FR)

(72) Inventor: Emmanuel Rouzade, Bessieres Occitaine (FR)

(73) Assignee: Latecoere, Toulouse (FR)

( * ) Notice: Subject to any disclaimer, the term of this patent is extended or adjusted under 35 U.S.C. 154(b) by 257 days.

(21) Appl. No.: 17/615,998

(22) PCT Filed: Jun. 3, 2020

(86) PCT No.: PCT/EP2020/065333
§ 371 (c)(1),
(2) Date: Dec. 2, 2021

(87) PCT Pub. No.: WO2020/245188
PCT Pub. Date: Dec. 10, 2020

(65) Prior Publication Data
US 2022/0324547 A1 Oct. 13, 2022

(30) Foreign Application Priority Data
Jun. 5, 2019 (FR) ...................... 1905935

(51) Int. Cl.
| | |
|---|---|
| *B64C 1/14* | (2006.01) |
| *B64D 25/08* | (2006.01) |
| *E05B 77/00* | (2014.01) |
| *E05B 83/36* | (2014.01) |
| *E05B 85/16* | (2014.01) |

(52) U.S. Cl.
CPC ............ *B64C 1/1423* (2013.01); *B64D 25/08* (2013.01); *E05B 77/00* (2013.01); *E05B 83/36* (2013.01); *E05B 85/16* (2013.01)

(58) Field of Classification Search
CPC .............................. B64C 1/1423; E05B 85/16
USPC ........................................ 244/129.5
See application file for complete search history.

(56) References Cited

U.S. PATENT DOCUMENTS

| | | | | |
|---|---|---|---|---|
| 3,743,336 | A | * | 7/1973 | Andrews ................. E05C 1/145 292/191 |
| 4,125,235 | A | | 11/1978 | Fitzgerald |
| 5,031,863 | A | | 7/1991 | Noble |
| 6,059,231 | A | * | 5/2000 | Dessenberger, Jr. ........ B64C 1/1407 292/336.3 |

(Continued)

FOREIGN PATENT DOCUMENTS

| | | | | |
|---|---|---|---|---|
| DE | 102019102263 A1 | * | 7/2020 | ............. B64C 1/068 |
| EP | 3312366 A2 | * | 4/2018 | ........... B64C 1/1415 |

(Continued)

*Primary Examiner* — Christopher P Ellis
(74) *Attorney, Agent, or Firm* — Defillo & Associates, Inc; Evelyn A. Defillo

(57) ABSTRACT

The invention concerns an aircraft door having a lever (3) for emergency opening from outside, disposed in a lever window. The lever (3) for emergency opening from outside includes: a main arm (7) having a first aerodynamic surface (9); a profiled cowling (8) with a second aerodynamic surface (10); a driving stop (18) capable of rotating the profiled cowling (8) from its concealing position to its separated position when the main arm (7) passes from its retracted position to its deployed position.

10 Claims, 4 Drawing Sheets

(56) References Cited

U.S. PATENT DOCUMENTS

| | | | | |
|---|---|---|---|---|
| 6,343,815 | B1* | 2/2002 | Poe | E05C 19/145 |
| | | | | 292/DIG. 31 |
| 9,033,277 | B2 | 5/2015 | Embraer | |
| 9,976,324 | B1* | 5/2018 | Edwards | E05B 13/002 |
| 10,301,005 | B2* | 5/2019 | Werthmann | B64C 1/143 |
| 10,533,353 | B2* | 1/2020 | Smart | E05B 81/76 |
| 10,900,262 | B2* | 1/2021 | Powell | E05B 85/103 |
| 10,953,997 | B2* | 3/2021 | Ainslie | B64D 33/02 |
| 11,511,844 | B2* | 11/2022 | Jackson | E05D 3/02 |
| 11,718,382 | B2* | 8/2023 | Gildas | B64C 1/1461 |
| | | | | 244/129.5 |
| 11,821,235 | B2* | 11/2023 | Amante | E05B 85/103 |
| 2003/0213095 | A1* | 11/2003 | Jackson | B64C 1/1407 |
| | | | | 16/110.1 |
| 2013/0106122 | A1* | 5/2013 | Do | B64D 29/06 |
| | | | | 292/228 |
| 2022/0412132 | A1* | 12/2022 | Dubosc | B64C 1/1461 |
| 2023/0082363 | A1* | 3/2023 | Rouzade | B64C 1/1423 |
| | | | | 244/129.5 |

FOREIGN PATENT DOCUMENTS

| | | | | |
|---|---|---|---|---|
| EP | 3670327 | A1 * | 6/2020 | B64C 1/1423 |
| WO | WO-2020245188 | A1 * | 12/2020 | B64C 1/1423 |

* cited by examiner

AIRCRAFT DOOR PROVIDED WITH A LEVER FOR EMERGENCY OPENING FROM OUTSIDE

CROSS REFERENCE TO RELATED APPLICATION

This application is a national stage entry of PCT/EP2020/065333 filed Jun. 3, 2020, under the International Convention and claiming priority over French Patent Application No. FR1905935 filed Jun. 5, 2019.

TECHNICAL FIELD

The invention relates to the field of aeronautics and relates more particularly to the means for emergency opening from the outside with which aircraft doors are generally provided.

Aircraft generally have means that allow intervention personnel outside the aircraft to open the doors of the aircraft in an emergency. These means generally have an emergency opening lever which can be grasped from the outside and which allows these external intervention personnel, for example rescue teams, to unlock and open the door by actuating a handle linked to this emergency opening lever.

PRIOR ART

Levers for emergency opening from the outside are already present on the doors of a large number of aircraft and are generally imposed by regulations. These emergency opening levers are positioned on the external wall of the aircraft door and have aerodynamic surfaces allowing them to be retracted into the profile of the door without adversely affecting the aerodynamic behavior of the aircraft in this area. The emergency opening levers are thus disposed in the continuation of the external wall of the door via their aerodynamic surfaces and the door is itself disposed in the continuation of the fuselage of the aircraft.

An aircraft door with an emergency opening lever positioned on the external wall is presented in the patent U.S. Pat. No. 4,125,235A and illustrates this aerodynamics-related constraint which limits the possible positions of the emergency opening lever within the aircraft door and also limits the maneuverability of the emergency opening lever.

SUMMARY OF THE INVENTION

The object of the invention is to improve the aircraft doors of the prior art with regard to the operation of the levers for emergency opening from the outside.

To that end, the invention concerns an aircraft door having a door structure, an external wall fixed to the door structure, and a lever for emergency opening from the outside, which is disposed in a lever window formed in the external wall. In this aircraft door, the lever for emergency opening from the outside has:
 a main arm provided at one of its ends with a handle and at the other one of its ends with an opening-movement transmission shaft, this transmission shaft being fixed with respect to the main arm, the main arm having a first aerodynamic surface extending from the handle to the transmission shaft, the transmission shaft being mounted so as to be pivotable on the door structure in such a way that the main arm can be moved between two positions:—a retracted position, in which the first aerodynamic surface is disposed in the contours of the lever window, in the continuation of the external wall;—a deployed position, in which the main arm is outside the lever window, this deployed position corresponding to
 a configuration of activation of the emergency opening from the outside;
 a profiled cowl having a second aerodynamic surface, this profiled cowl being mounted so as to be pivotable on the main arm between:—a concealing position, in which the second aerodynamic surface is aligned in the continuation of the first aerodynamic surface;—a swung-out position, in which the second aerodynamic surface is folded in the direction of the first aerodynamic surface;
 a driving abutment suitable for rotating the profiled cowl from its concealing position into its swung-out position when the main arm moves from its retracted position to its deployed position.

Another subject of the invention concerns a method for the emergency opening from the outside of an aircraft door provided with an emergency opening lever disposed in a lever window of the door, this method having the step of pivoting a main arm of the emergency opening lever over an angular travel between a retracted position and a deployed position, and, in the course of this angular travel, rotating a profiled cowl mounted so as to be pivotable on the main arm between a concealing position and a swung-out position, in which it is folded toward the main arm.

In such an aircraft door fitted with the lever for emergency opening from the outside, the angular deflection of the opening lever is independent of the intrusion of this lever into the door when the lever is in the open position.

An aircraft door according to the invention can thus have a large angular travel for the lever for emergency opening from the outside while there is only a slight intrusion of this lever within the thickness of the door, in the direction of the cabin of the aircraft. These advantages are obtained without any degradation of the aerodynamic qualities provided by the retraction of the opening lever into the lines of the door when the lever is in the rest position.

With equal angular deflection, such an aircraft door makes it possible to reduce the extent of the intrusion of the emergency opening lever into the aircraft cabin and therefore makes it possible to reduce the size and the mass of leak tight casings that are generally provided on aircraft doors to allow this intrusion of the opening lever while maintaining the tightness inside the aircraft cabin.

Furthermore, the levers for emergency opening from the outside are generally coupled to means for opening the aircraft door from the inside. However, the usage and regulations generally dictate that the means for opening the door from the inside require a triggering force less than that which is necessary for opening the door from the outside. In the prior art, the levers for emergency opening from the outside are generally coupled to the means for opening the door from the inside via gear reduction mechanisms using for example pinions and gear wheels and also transmission members, such as chains or connecting rods. An aircraft door according to the invention makes it possible to considerably simplify such an assembly by making it possible to rigidly couple a lever for emergency opening from the outside to means for opening from the inside, by eliminating a large number of moving mechanical parts, this increasing the reliability and reducing the production and maintenance costs of such a door. In such a case, the forces required to open the door from the inside, on the one hand, and from the outside, on the other hand, are then calibrated by the lever arms and the respective travels of the lever for actuating the internal opening means, on the one hand, and of the lever for emergency opening from the outside, on the other hand. The large angular deflection range permitted for the lever for emergency opening from the outside permits the necessary adaptation of the lever arm and of the lever travel allowing this rigid coupling of the lever for emergency opening from the outside and the means of opening from the inside.

The aircraft door according to the invention may have the following additional features, taken alone or in combination:
- the emergency opening lever has a drive surface against which the driving abutment is designed to butt for the purpose of rotating the profiled cowl by way of the main arm;
- the driving abutment is fixed to the main arm and the drive surface is located on the profiled cowl;
- the emergency opening lever has a return abutment suitable for rotating the profiled cowl from its swung-out position toward its concealing position when the main arm moves from its deployed position to its retracted position;
- the emergency opening lever has a return surface against which the return abutment is designed to butt for the purpose of rotating the profiled cowl by way of the main arm;
- the return abutment is fixed to the main arm and the return surface is located on the profiled cowl;
- a pivot connection between the main arm and the profiled cowl has two flanges mounted by a sliding fit on the transmission shaft;
- the main arm has a base on which the transmission shaft and the driving abutment are mounted;
- the profiled cowl has a tongue designed to butt against the external wall when the profiled cowl is in its concealing position;
- the emergency opening lever has a torsion spring that urges the profiled cowl toward a position in which the second aerodynamic surface is folded toward the first aerodynamic surface.

DESCRIPTION OF THE FIGURES

Other features and advantages of the invention will emerge from the nonlimiting description which follows, with reference to the appended drawings in which.

DETAILED DESCRIPTION OF THE INVENTION

Figure 1:
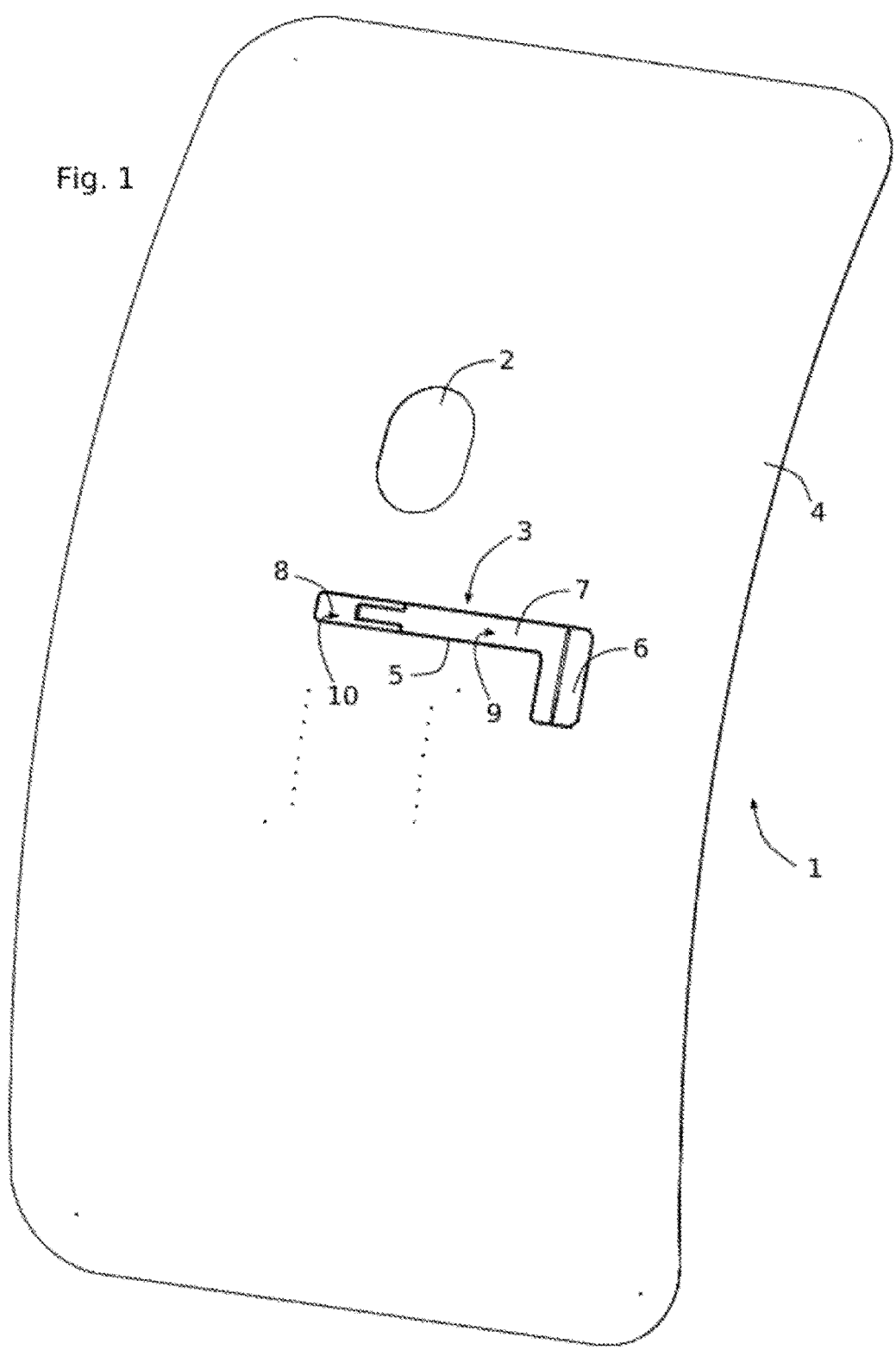
FIG. 1 shows an aircraft door according to the invention.

FIG. 1 shows an aircraft door in an external view. This aircraft door 1 is intended to close an opening in the fuselage of the aircraft and may be for example a door for regular access to the aircraft or an emergency exit door.

In the present example, the door 1 comprises a porthole 2 and a lever 3 for emergency opening from the outside. FIG. 1 shows the door 1 in a view from the outside of the aircraft. The aircraft door 1 is produced conventionally and has a door structure, generally made of beams (not visible in FIG. 1) to which is fixed an external wall 4 commonly referred to as "skin". The external wall 4 forms the outer surface of the aircraft at the door 1. In the event of emergency opening by an operator located outside the aircraft, the emergency opening lever 3 is intended to be actuated from that face of the door 1 that is visible in this FIG. 1.

In FIG. 1, the emergency opening lever 3 is in the rest position. In this position, the opening lever 3 is in the continuation of the external wall 4, that is to say that the lever 3 forms a continuous surface with the external wall 4 in order to ensure the aerodynamic qualities of the door 1.

The opening lever 3 is disposed in a lever window 5 formed in the external wall 4. When the opening lever 3 is in its rest position, as illustrated in FIG. 1, the window 5 is completely concealed by the opening lever 3 and by a concealing flap 6.

The opening lever 3 has a main arm 7 and a profiled cowl 8. The main arm 7 has a first aerodynamic surface 9 and the profiled cowl 8 has a second aerodynamic surface 10, which aerodynamic surfaces are designed to conceal the window 5 by fitting into the curvature of the external wall 4. The concealing flap 6 is mounted so as to be pivotable on the external wall 4 and completes this concealment.

The surfaces 9 and 10 are referred to as aerodynamic because they form a portion of the outer skin of the aircraft and contribute to the aerodynamic behavior of the aircraft. Preferably, these aerodynamic surfaces are smooth and do not have any roughness or cavity.

In an emergency, in order to actuate the emergency opening lever 3, the operator located outside the aircraft pushes the concealing flap 6 back by hand, grasps the lever 3 and firstly pulls it toward him.

In the present example, the opening lever 3 pivots about a substantially vertical axis, making it possible for it to have a large angular deflection. Indeed, the levers pivoting about a substantially horizontal axis have a travel which is generally limited by the shape of the door and by the height of the lever in the open position.

Figure 2:
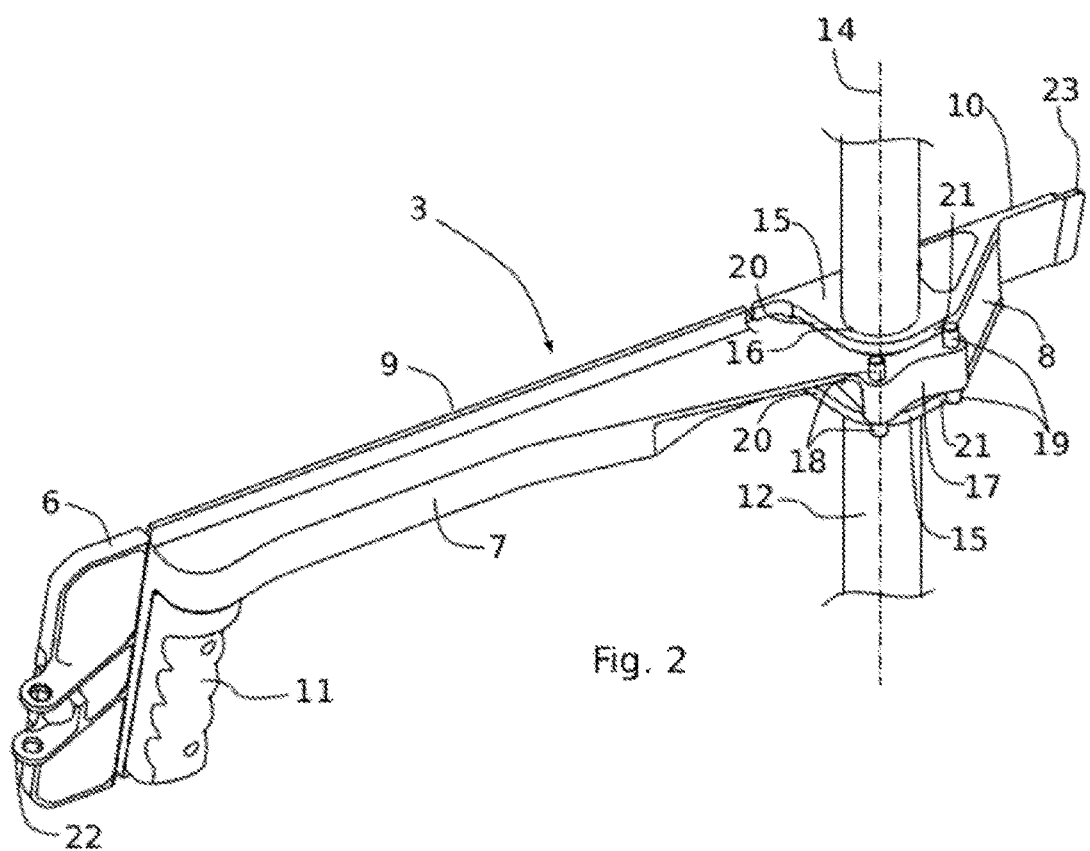
FIG. 2 shows in perspective the lever for emergency opening from the outside of the aircraft door of FIG. 1.

FIG. 2 shows in perspective the opening lever 3 of FIG. 1. The main arm 7, visible in this FIG. 2, is provided at one of its ends with a handle 11 and at the other of its ends with an opening-movement transmission shaft 12.

The transmission shaft 12 and the main arm 7 are mounted so as to rotate conjointly by any means, for example by a force branching of the shaft 12 in a bore in the main arm 7 or by a spline mounting. In the present example, the main arm 7 has at its end a base 17 in which is formed a bore which is thus rotationally coupled to the shaft 12.

The transmission shaft 12 is mounted so as to be able to rotate on the door structure, about its longitudinal axis 14. The shaft 12 is connected to the mechanism for unlocking the door 1. In this way, when the handle 11 is actuated so as to pivot the main arm 7 about the longitudinal axis 14 of the shaft 12, the latter is rotated about its axis 14 and this rotation unlocks the door, via a conventional mechanism (not shown). Here, the main arm 7 is directly connected to the transmission shaft 12 in a simple, reliable and inexpensive manner, without any mechanical gear reduction or movement transmission means.

Figure 3:
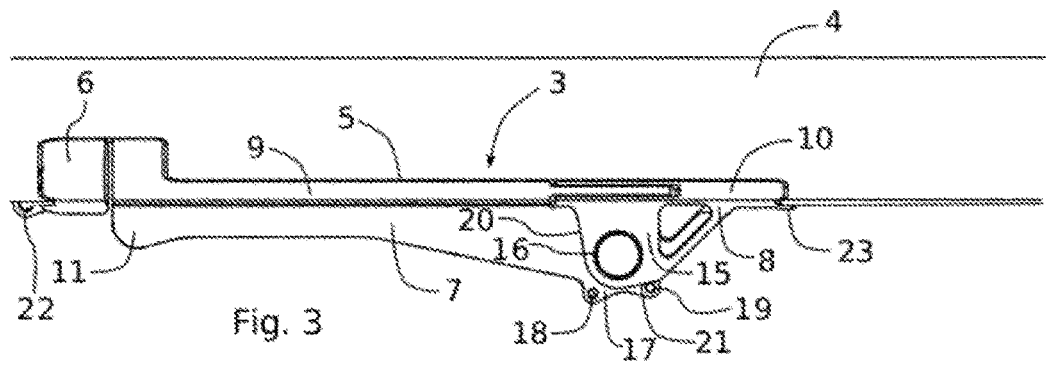
FIG. 3 is a partial sectional view of the aircraft door of FIG. 1, the opening lever being in the rest position.

The profiled cowl 8 of the opening lever 3 is also visible in FIG. 3. This cowl 8 is mounted so as to be pivotable on the end of the main arm 7. This pivoting mounting may be realized by any pivot connection and, in the present example, this pivot connection is realized in a simple and reliable manner by two parallel flanges 15 each having an orifice 16, the diameter of which is calibrated for a sliding fit with the transmission shaft 12. In this way, the cowl 8 can be rotated with respect to the main arm 7, about the axis 14, between a concealing position (FIG. 3) and a swung-out position (visible in FIG. 5).

The view of FIG. 2 corresponds to the rest position of the opening lever 3, this being a position in which the first aerodynamic surface 9 of the main arm 7 and the second aerodynamic surface 10 of the profiled cowl 8 are in the continuation of one another along the profile of the external wall 4 of the door 1.

The opening lever 3 additionally has driving abutments 18 as well as return abutments 19, all located on the base 17. In the present example, the abutments 18, 19 are formed by pins force-fitted in the base 17.

The driving abutment 18 is designed to engage with drive surfaces 20 of the cowl 8 in such a way that, when the main arm 7 is actuated in rotation by virtue of the handle 11, its rotational movement rotates the cowl 8 over part of its travel.

The return abutments 19 are for their part designed to engage with return surfaces 21 of the cowl 8 in such a way that the cowl 8 is rotated by the main arm 7 when the latter is rotated in the opposite direction to that in the preceding paragraph. In the rest position of the opening lever 3 illustrated in FIG. 2, the return abutments 19 are disposed against the return surfaces 21.

FIG. 2 also shows the concealing flap 6, shown in its position corresponding to that of FIG. 1, this concealing flap 6 being mounted on the external wall 4 of the door 1 via a pivot 22.

Figure 4:
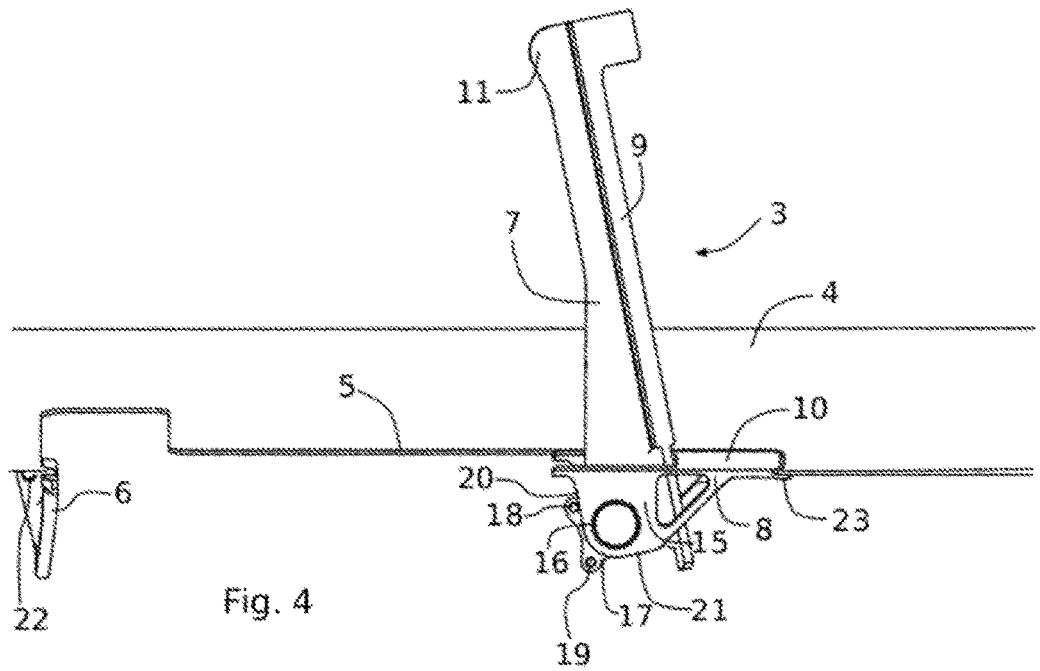
FIG. 4 is a partial sectional view of the aircraft door of FIG. 1, the opening lever being between its rest position and its open position.
Figure 5:
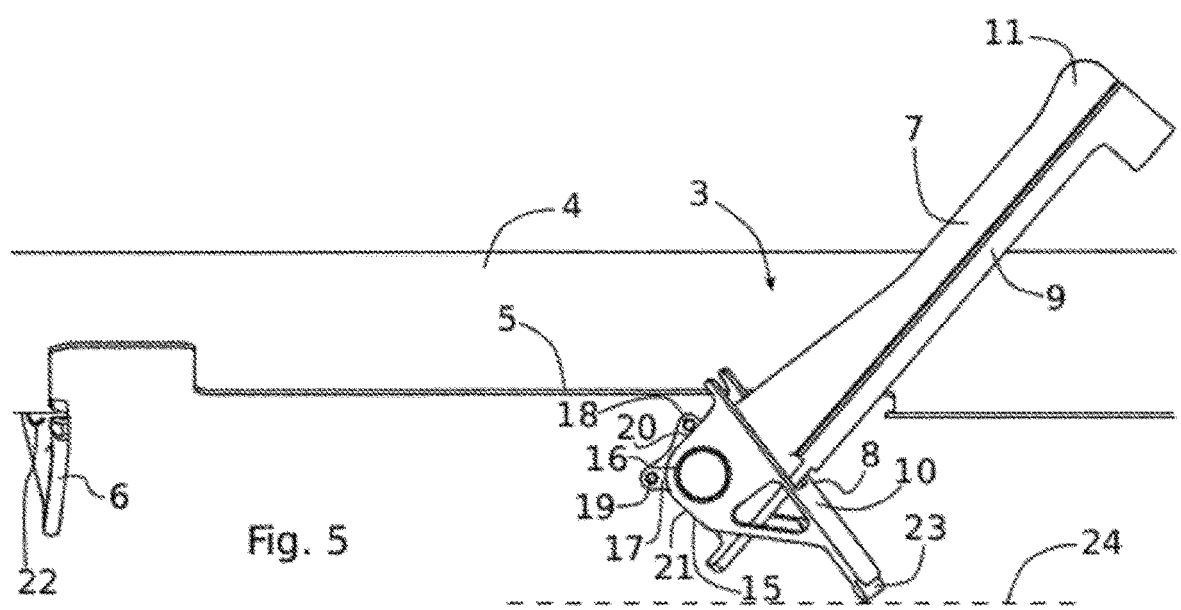
FIG. 5 is a partial sectional view of the aircraft door of FIG. 1, the opening lever being in the open position.

FIGS. 3 to 5 illustrate the operation of the opening lever 3, the door 1 being shown in partial section in order to demonstrate the engagement of the different elements of the opening lever 3 and of the external wall 4.

In FIG. 3, the opening lever 3 is in its rest position, as in FIG. 1. In this rest position, the main arm 7 is in its retracted position, the first aerodynamic surface 9 being aligned with the surface of the external wall 4.

Means are provided for elastically urging the main arm 7 and the profiled cowl 8 toward a mutual position in which the second aerodynamic surface 10 is folded toward the first aerodynamic surface 9 (which position is visible in FIGS. 4 and 5). For example, a torsion spring may be positioned about the axis 14 in order to thereby permanently urge the profiled cowl 8 toward this position of being folded in the direction of the main arm 7.

In this rest position of the opening lever 3, the cowl 8 is in its concealing position and its second aerodynamic surface 10 completes the action of the first aerodynamic surface 9 so as to conceal the window 5. The cowl 8 has a tongue 23 intended to butt against the external wall 4 when the second aerodynamic surface 10 is in its concealing position, aligned with the surface of the external wall 4. The cowl 8 can thus pivot toward the inside of the aircraft but not toward the outside.

In this rest position of the opening lever 3, the main arm 7 is held in position because it is integral with the transmission shaft 12, while the cowl 8 is held in position by the engagement of the return abutments 19 of the return surfaces 21 which urge the tongue 23 against the external wall 4. The above-mentioned torsion spring between the main arm 7 and the cowl 8 completes this positioning by urging the tongue 23 against the external surface 4, thus avoiding, or limiting, the effect of vibrations which could result in the tongue 23 slamming against the external wall 4 under the effect of the mechanical clearances necessarily present between the parts.

In FIG. 3, the concealing flap 6 is in the closed position and is held in this position by a spring (not shown).

FIG. 4 illustrates a situation of actuation of the opening lever 3 in which the lever 3 is shown approximately at the midpoint of its angular travel. Between the position of FIG. 3 and the position of FIG. 4, the main arm 7 left its retracted position and moved through a certain angular travel, while the cowl 8 remained in its concealing position. This is because the main arm 7 pivoted about the axis 14 with rotation of the transmission shaft 12, while the torsion spring mounted between the main arm 7 and the cowl 8 holds the cowl 8 in its concealing position while continuing to urge the tongue 23 against the external wall 4.

At this angular travel of FIG. 4, the driving abutments 18 come into contact with the drive surfaces 20, in such a way that the continued rotation of the main arm 7 will then also rotate the cowl 8.

FIG. 5 illustrates the open position of the opening lever 3, at the end of the angular travel. Between the position of FIG. 4 and the position of FIG. 5, the main arm 7 continued its rotation under the effect of the action on the handle 11 exerted by the operator located outside the aircraft, with rotation of the cowl 8 over this portion of its angular travel.

Between the position of FIG. 4 and the position of FIG. 5, the cowl 8 moved from its concealing position to its swung-out position, thus freeing up an additional space of the window 5 to allow the main arm 7 to finish its long angular travel. In the example illustrated, the main arm 7 in its deployed position moved through an angular travel of approximately 150°. An angular travel of such a magnitude makes it possible for example to reduce the lever arm, and therefore the bulk of the opening lever 3, or to increase the actuating force of the opening lever 3 for the same lever arm.

The dotted line 24 schematically shows the distance to which the handle intrudes into the cabin of the aircraft. This intrusion distance stipulates the space that needs to be reserved within the structure of the door 1 in order to operate the opening lever 3 and in particular stipulates the size of the leak tight box that needs to be provided against the external wall 4 to maintain the tightness of the door 1 despite the presence of the opening lever 3. The opening lever 3 in its open position illustrated in FIG. 5 has a small intrusion distance while still allowing a large actuation travel.

For the reverse maneuver for passing the opening lever 3 from its open position to its rest position, the movement is performed in the opposite direction, from the position of FIG. 5 to the position of FIG. 4 then to the position of FIG. 3. Between the position of FIG. 5 and the position of FIG. 4, the rotation of the main arm 7 is accompanied by the rotation of the cowl 8 under the effect of the torsion spring. If the torsion spring is not able to control the rotation of the cowl 8, the return abutment 19 will then come into contact with the return surfaces 21 and ensure that the cowl 8 returns to its concealing position with the rotation of the main arm 7. From FIG. 4, the tongue 23 is positioned against the external wall 4 and the continued rotation of the main arm in the direction of the position of FIG. 3 is realized by compressing the torsion spring until the return abutments 19 come into contact with the return surfaces 21.

Alternative embodiments of the aircraft door and of the lever 3 for emergency opening from the outside can be envisaged without departing from the scope of the invention. For example, the profiled cowl 8 and the window 5 may vary in terms of shape and size and also the angular travel of the main arm 7.

Furthermore, the positioning of the abutments 18, 19 may vary, it being possible for the driving abutments 18 or return abutments 19 to be placed on the profiled cowl 8, for example.

The invention claimed is:

1. An aircraft door (1) having a door structure, an external wall (4) fixed to the door structure, and a lever (3) for emergency opening from the outside, which is disposed in a lever window (5) formed in the external wall (4), the lever (3) for emergency opening from the outside comprises:
- a main arm (7) provided at a first end with a handle (11) and at a second end with an opening-movement transmission shaft (12), the transmission shaft (12) being fixed with respect to the main arm (7), the main arm (7) having a first aerodynamic surface (9) extending from the handle (11) to the transmission shaft (12), the transmission shaft (12) being mounted so as to be pivotable on the door structure in such a way that the main arm (7) moves between t
- a retracted position, in which the first aerodynamic surface (9) is disposed in the contours of the lever window (5), in the continuation of the external wall (4); and
- a deployed position, in which the main arm (7) is outside the lever window (5), the deployed position corresponding to a configuration of activation of the emergency opening from the outside;
- a profiled cowl (8) having a second aerodynamic surface (10), the profiled cowl (8) being mounted so as to be pivotable between:
- a concealing position, in which the second aerodynamic surface (10) is aligned in the continuation of the first aerodynamic surface (9);
- a swung-out position, in which the second aerodynamic surface (10) is folded in the direction of the first aerodynamic surface (9);
- the profile cowl (8) is mounted to be pivotable on the main arm (7), and
- a driving abutment (18) suitable for rotating the profiled cowl (8) from the concealing position into the swung-out position when the main arm (7) moves from the retracted position to the deployed position.

2. The aircraft door as claimed in claim 1, wherein the emergency opening lever (3) has a drive surface (20) against which the driving abutment (18) is designed to butt for the purpose of rotating the profiled cowl (8) by way of the main arm (7).

3. The aircraft door as claimed in claim 2, wherein the driving abutment (18) is fixed to the main arm (7) and the drive surface (20) is located on the profiled cowl (8).

4. The aircraft door as claimed in claim 1, wherein the emergency opening lever (3) has a return abutment (19) suitable for rotating the profiled cowl (8) from the swung-out position toward the concealing position when the main arm (7) moves from the deployed position to the retracted position.

5. The aircraft door as claimed in claim 4, wherein the emergency opening lever (3) has a return surface (21) against which the return abutment (19) is designed to butt for the purpose of rotating the profiled cowl (8) by way of the main arm (7).

6. The aircraft door as claimed in claim 5, wherein the return abutment (19) is fixed to the main arm (7) and the return surface (21) is located on the profiled cowl (8).

7. The aircraft door as claimed in claim 1, wherein a pivot connection between the main arm (7) and the profiled cowl (8) has two flanges (15) mounted by a sliding fit on the transmission shaft (12).

8. The aircraft door as claimed in claim 1, wherein the main arm (7) has a base (17) on which the transmission shaft (12) and the driving abutment (18) are mounted.

9. The aircraft door as claimed in claim 1, wherein the profiled cowl (8) has a tongue (23) designed to butt against the external wall (4) when the profiled cowl (8) is in the concealing position.

10. The aircraft door as claimed in claim 1, wherein the emergency opening lever (3) has a torsion spring that urges the profiled cowl (8) toward a position in which the second aerodynamic surface (10) is folded toward the first aerodynamic surface (9).

* * * * *